United States Patent [19]

Benthake et al.

[11] 4,391,163
[45] Jul. 5, 1983

[54] PLANETARY GEAR ASSEMBLY

[75] Inventors: Heinz Benthake, Kassel; Curt Krönert, Mülheim; Josef Kunnen, Meerbusch, all of Fed. Rep. of Germany

[73] Assignee: Thyssen Industrie AG, Fed. Rep. of Germany

[21] Appl. No.: 152,607

[22] Filed: May 23, 1980

[30] Foreign Application Priority Data

Feb. 14, 1980 [DE] Fed. Rep. of Germany ....... 3005463

[51] Int. Cl.³ .......................... F16H 3/44; F16H 1/28
[52] U.S. Cl. ...................................... 74/768; 74/797; 74/785; 74/411
[58] Field of Search ................. 74/785, 788, 797, 801, 74/753, 768, 769, 410, 411

[56] References Cited

U.S. PATENT DOCUMENTS

| 2,625,056 | 1/1953 | Kelley | 74/769 |
| 3,234,821 | 2/1966 | Hummel et al. | 74/768 |
| 4,007,648 | 2/1977 | Bookout | 74/753 |

FOREIGN PATENT DOCUMENTS

| 1211457 | 2/1966 | Fed. Rep. of Germany | 415/175 |
| 1216645 | 5/1966 | Fed. Rep. of Germany | 74/801 |
| 2618882 | 11/1977 | Fed. Rep. of Germany | |
| 2841331 | 4/1980 | Fed. Rep. of Germany | 74/801 |
| 2002448 | 2/1979 | United Kingdom | 74/801 |
| 2034000 | 5/1980 | United Kingdom | 74/788 |

Primary Examiner—Lawrence J. Staab
Assistant Examiner—Lawrence J. Gotts
Attorney, Agent, or Firm—McGlew and Tuttle

[57] ABSTRACT

A planetary gear assembly comprises, a housing with an input shaft rotatably mounted in the housing and being advantageously hollow so as to provide a means for rotatably supporting a central gear. The central gear includes two axially spaced helical gear portions which mesh with oppositely helically geared rotatable planetary gears having respective shafts supported on planet carriers which are selectively connected either to the input shaft or to an output shaft which is rotatably mounted adjacent the input shaft. A planetary gear is also meshed with outer central gears or internal gears which are affixed to the housing. The inner central gears are mounted so that they may be displaced axially to absorb stressing during operation. In addition, the internal gear advantageously includes a hub portion which provides a mounting for a planetary gearing of another faster running planetary stage.

3 Claims, 1 Drawing Figure

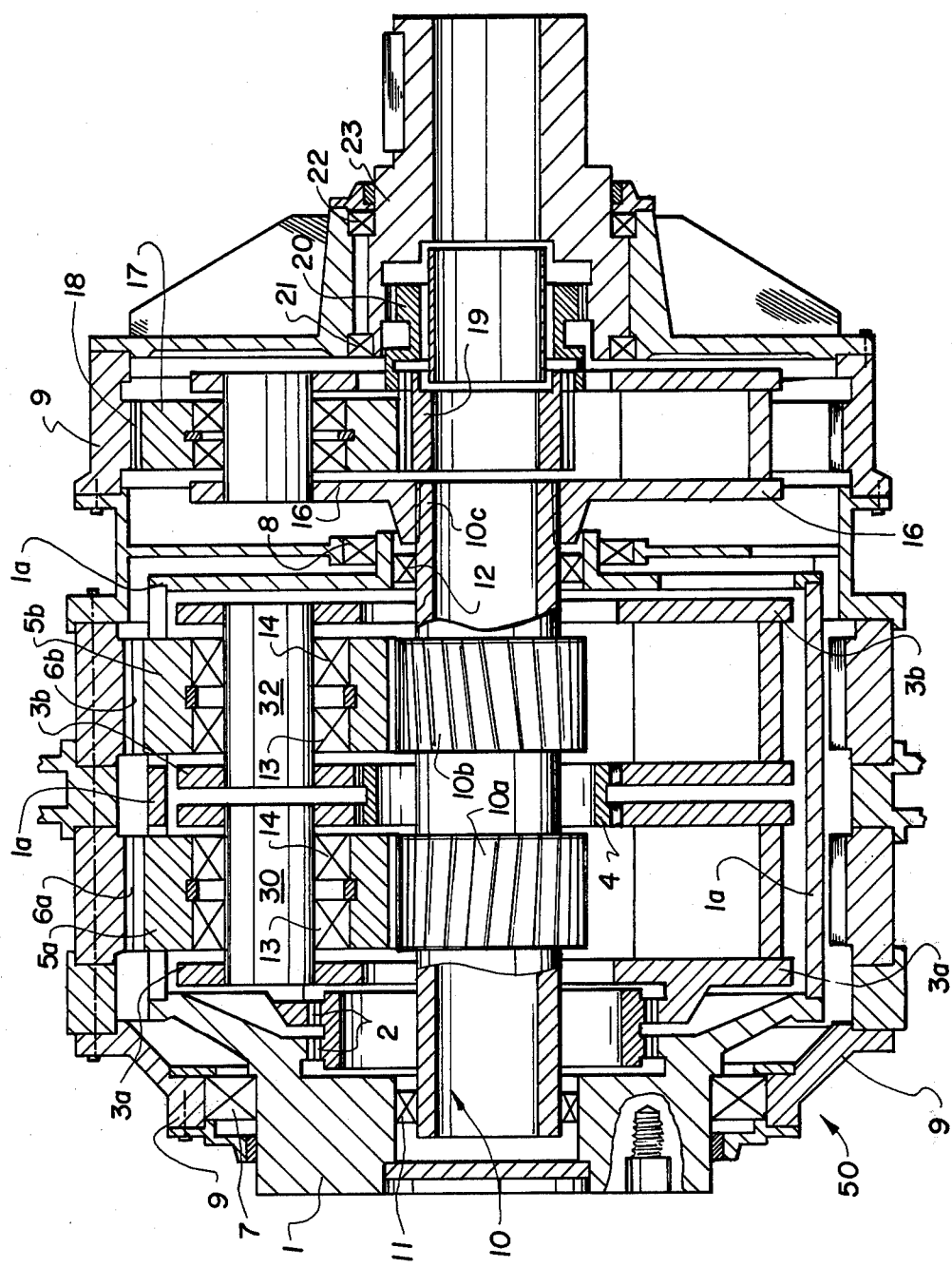

PLANETARY GEAR ASSEMBLY

FIELD AND BACKGROUND OF THE INVENTION

The invention relates in general to gearing and in particular to a new and useful planetary gear assembly with helical and double helical gears, permitting the connection of another, faster running planetary stage to an inner central gear of the gearing. Gearings with helical and double helical gears exhibit a particularly quiet run with little noise, if the load on the planet wheels is well distributed.

A prior art planetary gearing, known from German Offenlegunsschrift No. 2618882, comprises a double helical inner central gear which is mounted on the input shaft for free axial displacement and which drives two mutually parallel sets of planet wheels which have oppositely directed helical teeth and whose planet carriers are connected to each other, one of them being connected to the output shaft through double-joint clutches, particularly double-toothed clutches.

Because the planet wheels are divided in two sets independent of each other, the torque is split by this gearing six times and a transmission of higher torques is made possible.

Another advantage of the distribution of the planet wheels to two individual sets is that antifriction bearings can be used for the gears, which results in relatively small center-to-center distances between the main component parts and thus to small overall dimensions of the gearing, so that such a gearing is very well suited, for example, for driving rolling or bending machines.

These gearings have proved suitable for relatively slow drives. With higher speeds, however, difficulties arise from additional dynamic loads caused by bigger rotating masses, which unfavorably affect the independent adjustment of the planet wheels determined by the many degrees of freedom, so that the run becomes unquiet.

SUMMARY OF THE INVENTION

The invention eliminates the drawbacks of the known construction, and is directed to a design ensuring not only a quiet run even at higher speeds but also an advantageous and trouble-free connection to another, faster running planetary stage.

To this end, the invention provides, with a reduction of the number of degrees of freedom of the inner central gear and of the planet wheels, that the double helical inner central gear is rotatable at a radially fixed location. The planet wheels have carriers that are mounted for displacement in the housing in the axial direction. The central gear is also axially movable. In this way, the inner central gear exerts a radial directional force (centering effect) on the planet carriers through the planet wheels, which force counteracts the additional dynamic loads produced at higher speeds, however, the possibility of independent axial adjustment of the planet carriers and the central gear, and thereby, the load equilibration between the two sets of planet wheels is preserved due to the capability of the carriers and central gear to move axially. The run of the gearing is thereby quieted to a large extent. A further advantageous embodiment of the invention provides that if another, faster running planetary stage is connected, the planet carrier of this stage is firmly fitted to the inner central gear of the first stage. Thereby, the relatively long hub portion of the inner central gear of the first stage is advantageously utilized for mounting the planet carrier of the additional stage and, further, two additional bearings for this planet carrier are saved so that the overall length of the gearing is reduced.

In instances where the gearing serves as an attachment, it has been proved particularly advantageous to mount the input or output shaft connected to the planet carriers in the housing in a manner known per se, on both sides of the sets of planet wheels, by means of an extension penetrating therethrough. This not only considerably reduces the overall length of the gearing but also offers the possibility of better taking up the moment of reaction of the outer central gears of the assembly and keeping additional loads off the attached shaft by providing the torque absorbing support of the gearing between the bearings.

A design in which a shaft connected to a surrounding planet carrier through a gear coupling, is supported at both sides of the planet carrier by means of an extension penetrating the set of planet wheels is known from German Pat. No. 1211457. However, the purpose of this design is only to reduce the overall length of the planetary gearing, not constructed in a manner to improve the capability of an attached gear assembly of better taking up the forces of reaction.

Accordingly, it is an object of the invention to provide a planetary gear assembly which includes an inner central gear which is mounted preferably for axial displaceable movement in addition to rotational movement and has helical gear portions which engage with oppositely helically geared planet gears which are rotatably supported on carriers which may be connected either to an input or output shaft and are mounted for axial movement as well.

A further object of the invention is to provide a planetary gear assembly in which the inner central gear which engages with two planetary gears may advantageously also be provided with a hub portion which carries a faster running planetary gear set.

A further object of the invention is to provide a planetary gear assembly which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

DESCRIPTION OF THE DRAWINGS

The only FIGURE of the drawings is an axial sectional view of a planetary gear constructed in accordance with the invention.

DESCRIPTION OF THE PREFERRED EMBODIMENTS

Referring to the drawing in particular the invention embodied therein, comprises a planetary gearing generally designated 50 which in addition a principal feature of the invention includes an inner central gear generally designated 10 having helical gear portions 10a and 10b which mesh with oppositely directed helical gear portions of planetary wheels or gears 5a, and 5b and in addition includes an embodiment wherein the inner gear 10 also includes a hub portion 10c which provides a support for a planetary carrier 16 of another faster running planetary gearing stage.

The FIGURE shows a planetary gear assembly with double helical gears, with another, faster running planetary stage being connected to an inner central gear of the gearing. The gear assembly is designed as an attachment which may be connected, at its slow side (left-hand side) for example, to a turbine shaft (not shown), with the output shaft of the following, faster running stage (right-hand side) driving a generator, for example.

The FIGURE shows a drive shaft 1 to which a left-hand planet carrier 3a is rotatable and axially movably connected through a gear coupling 2. A right-hand planet carrier 3b, in turn, is rotatable and axially movably connected to planet carrier 3a through a gear coupling 4. A cage-like extension 1a of drive shaft 1 extends through the two sets of planet wheels, between planet wheels 5a and 5b and fixed outer central gears of internal gears 6a and 6b, and is supported in housing 9 at both sides of the planet wheel sets by antifriction bearings 7 and 8 on the drive shaft 1. Carriers 3a and 3b are axially movable with respect to drive shaft 1 and with respect to each other since the teeth of gears 2 and 4 extend axially in known fashion.

An inner central gear 10, serving as the output shaft and carrying two helical-gear portions 10a and 10b, is mounted in drive shaft 1 by means antifriction bearings 11 and 12 so as to be rotatable and radially fixed in position but axially displaceable (inner bearing ring of bearings 11 and 12 are without a stop collar). The rotational power of shaft 1 is thus all transferred to carrier 3a over gear 2 with part of this power there transferred to carrier 3b over gear 4 and part directly to central gear 10.

The planet wheels 5a and 5b which mesh with the double helical inner central gear 10 have oppositely directed helical gearings and engage with the corresponding helical portions of outer central gears 6a and 6b which are secured to the housing 9 and take up the moment of reaction. Planet wheels 5a and 5b are mounted on their respective associated shaft 30 and 32 by means of antifriction bearings 13 and 14.

Between the two bearings 7 and 8, a torque absorbing support is provided on housing 9.

On a hub portion 10c of inner central gear 10, a planet carrier 16 of another, faster running planetary stage is firmly fitted, for example shrink-fitted. The planet wheels 17 of this stage mesh with an outer central gear 18 which is secured to housing 9, and with an inner central gear 19. Gear 19 is connected for free motion through a gear coupling 20 to an output shaft 23 which is mounted in housing 9 by means of antifriction bearings 21 and 22.

The inventive gear assembly runs very quietly even at higher speeds; in addition, the entire assembly has a relatively very short overall length and small diameter, so that it is particularly well usable also as an attachment.

While specific embodiments of the invention have been shown and described in detail to illustrate the application of the principles of the invention, it will be understood that the invention may be embodied otherwise without departing from such principles.

What is claimed is:

1. A planetary gear assembly comprising a housing (9), an input shaft (1) rotatably mounted in said housing, an output shaft (23) mounted for rotation adjacent said input shaft, a pair of outer central internal gears (6a,6b) fixed to said housing, an inner central gear (10) having two axially spaced opposite helical gear portions (10a,10b), first and second substantially parallel rotatable planetary gears (5a,5b) having oppositely helically geared portions disposed between said outer central internal gears and said inner central gear and in meshing engagement with said outer central internal gears and said axially spaced opposite helical gear portions of said inner central gear, first and second carriers (3a,3b) for supporting said first and second planetary gears for rotation respectively, and for revolving movement around said inner central gear, a first gear coupling (2) connecting said first carrier (3a) to said input shaft for co-rotation and relative axial motion for transmitting all rotational power from said input shaft to said first carrier, a second gear coupling (4) connecting said first and second carriers (3a,3b) for co-rotation and relative axial motion so that a portion of the rotational power from said first carrier is transmitted to said second carrier over said second gear coupling and a remainder of the power is transmitted directly to said central gear over one of said opposite helical gear portions, and bearing means (11,12) mounting said inner central gear for rotation and for axial displacement in a fixed radial position in said housing.

2. A planetary gear assembly according to claim 1, wherein said inner central gear includes a hub portion defining a connection for another planetary gear stage.

3. A planetary gear assembly according to claim 1, wherein said inner central gear includes an axially extending hub portion (10c), a faster running planetary gear carrier mounted on said inner central gear hub portion, a faster planetary wheel mounted on said faster running carrier (16) for rotation therewith, a second inner central gear engaged with said faster running planetary wheel, and a further outer central gear (18) engaging said fast running planetary wheel.

* * * * *